United States Patent [19]

Artner et al.

[11] 3,803,368

[45] Apr. 9, 1974

[54] TAPE PLAYER DEVICE HAVING DOOR ACTUATED CARTRIDGE EJECT MECHANISM

[75] Inventors: Marcus M. Artner, Chicago; Paul D. McGee, Medinah, both of Ill.

[73] Assignee: Motorola, Inc., Franklin Park, Ill.

[22] Filed: May 22, 1972

[21] Appl. No.: 255,499

[52] U.S. Cl. .......................... 179/100.11, 274/4 B

[51] Int. Cl. ...................... G11b 31/00, H04b 1/20

[58] Field of Search .......... 242/198; 274/4 BC, 4 D, 274/4 E, 4 F; 340/174.1; 179/100.2 Z, 100.11, 100.12

[56] References Cited

UNITED STATES PATENTS

| | | | |
|---|---|---|---|
| 3,536,859 | 10/1970 | Tolar | 179/100.11 |
| 3,541,273 | 11/1970 | Lyon | 179/100.2 |
| 3,593,327 | 7/1971 | Shill | 340/174.1 |
| 3,729,202 | 4/1973 | Wakabayashi | 274/4 D |

*Primary Examiner*—Leonard D. Christian
*Attorney, Agent, or Firm*—Ronald J. LaPorte; Vincent J. Rauner

[57] ABSTRACT

A device adapted for playing tape cartridges includes a door member mounted for manual movement with respect to the cartridge receiving opening thereof. Insertion of a tape cartridge into the opening moves a cartridge eject mechanism to an eject-ready condition and positions a link actuator into engagement with the door member, closing the latter partially. Manual opening of the door member thereafter actuates the eject mechanism to remove the cartridge from the device. The door member may be fully closed over the cartridge when the latter is inserted into the device.

A preferred embodiment of the device includes a radio receiver portion, the operation of which is controlled by a mode selector switch coupled to the link actuator and operated to tape player and radio modes in response to the insertion and ejection of a tape cartridge into and out of the device, respectively. Closure of the door member partially in response to the insertion of a cartridge renders a radio tuner control inaccessible during the tape player mode of operation.

12 Claims, 6 Drawing Figures

TAPE PLAYER DEVICE HAVING DOOR ACTUATED CARTRIDGE EJECT MECHANISM

BACKGROUND

This invention relates generally to devices for playing back cartridge type tapes which include means for actuating a cartridge eject mechanism provided therein, and more particularly to such tape player devices which include a manually operable door member covering the cartridge receiving opening of the player and, within the tape player housing, radio signal receiver instrumentalities.

It is desirable in a device adapted for playing cartridge tapes upon completion of the playing of a desired portion of a tape, to be able to eject the cartridge from the player. In the case of a tape player device having a manually operated door member covering the cartridge receiving opening, it is convenient to operate the ejector mechanism in response to the full opening of the door member. Furthermore, in the case of a cartridge type tape player device including a radio receiver in the housing thereof, it is desirable upon ejection of the cartridge from the device, to automatically change the operating mode thereof from the "tape player" mode to the "radio receiver" mode. During the time the apparatus is in the tape player mode, it also is advantageous to prevent operation of the radio tuner control, thereby avoiding detuning of the radio receiver when the latter is not operable.

SUMMARY

Accordingly, it is an object of the present invention to provide in a device adapted to play tape cartridges including a cartridge eject mechanism and a manually controlled door member covering the cartridge receiving opening of the device, new and improved means for actuating the cartridge eject mechanism upon opening the door member, to remove a tape cartridge therefrom.

It is yet another object of the present invention to provide a cartridge type tape player device having a manually operated door member which can be fully closed over a cartridge received in the player during playback of information recorded on a tape within the cartridge.

It is another object of the present invention to provide a tape cartridge player device of the above described type including a radio receiver therein, which, upon ejection of a cartridge from the device, is placed in an operative mode automatically.

It is still another object of the present invention to provide a combination tape player/radio receiver device of the last-mentioned type wherein the radio tuning knob is inaccessible during the time the device is in the tape player mode, and which becomes accessible upon operation of the device to the radio receiver mode.

Briefly, a preferred embodiment of the cartridge tape player device according to the invention includes a cartridge receiving opening over which a "roll top" door member is provided. A radio tuning control knob for radio signal receiver instrumentalities included in the device, is provided adjacent the cartridge receiving opening, and both the tuning knob and cartridge receiving opening are coverable by the door member upon movement of the latter to a fully closed position.

The cartridge tape player device includes a cartridge eject mechanism which is actuated to an eject-ready position upon insertion of a cartridge into the cartridge receiving opening, subsequent to opening the door to expose the former. Actuation of the cartridge eject mechanism, upon insertion of the cartridge into the player, moves a link member which engages the door member to reclose the latter partially, thereby covering a portion of the inserted tape cartridge and the radio tuning knob, making the latter inaccessible to an operator. A mode selecting switch, also coupled to the link member, is operated to the tape player mode.

When it is desired to eject the cartridge from the player device, the door member is moved to a fully open position. The door member engages the link member which in turn actuates the cartridge eject mechanism, thereby removing the cartridge from the player. Movement of the link member to actuate the cartridge eject mechanism likewise operates the mode selector switch to the radio receiver mode position and the movement of the door member to a fully open position exposes the tuning knob of the radio receiver portion of the device.

DETAILED DESCRIPTION

Figure 1:
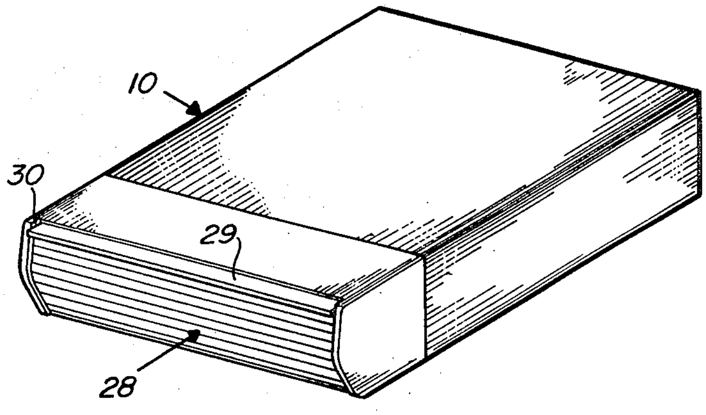
FIG. 1 is a perspective view of a combination cartridge tape player/radio receiver device embodying the features according to the invention.

Referring now to the drawings in greater detail wherein like numerals have been employed throughout the various views to designate similar parts, there is shown in FIG. 1 a combination cartridge type tape player/radio receiver device 10 incorporating the usual tape driving and playing instrumentalities including electrical circuitry (not shown) and a cartridge receiving tunnel 12 (FIGS. 5 and 6) into which a cartridge, such as, 14, is inserted for playback of information recorded on the magnetic tape included therein. The cartridge is received through a front opening or entrance 16 of the tunnel 12.

The usual controls 18 for adjusting tone, volume, etc., of the device are included along a front panel 20 located above the cartridge receiving opening 16. A power or on/off control button 19 and a monaural-stereo selector control button 21 are also provided on panel 20. In addition, a tape track indicator 22 is mounted on the panel 20 adjacent controls 18.

Directly beneath the tape track indicator 22, there is provided a radio receiver tuner control knob 24, herein shown as a "thumb wheel" type, (FIGS. 3 and 4) and thereabove a dial indicator 26 for the radio receiver portion of the device. Suitable radio signal receiving instrumentalities including necessary circuitry (not shown) are also incorporated in the device for operation in the radio receiver mode.

Figure 2:
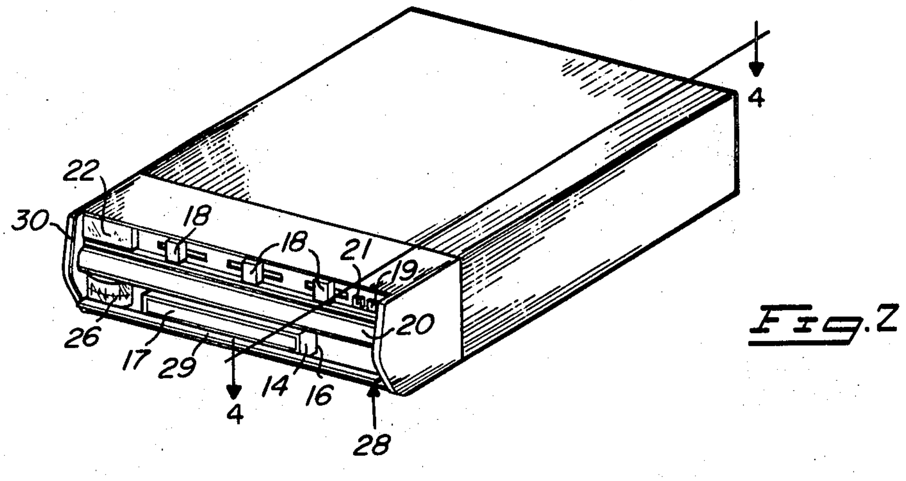
FIG. 2 is a perspective view of the combination tape player/radio receiver device of FIG. 1 shown with a tape cartridge inserted into the cartridge receiving opening thereof.
Figure 3:
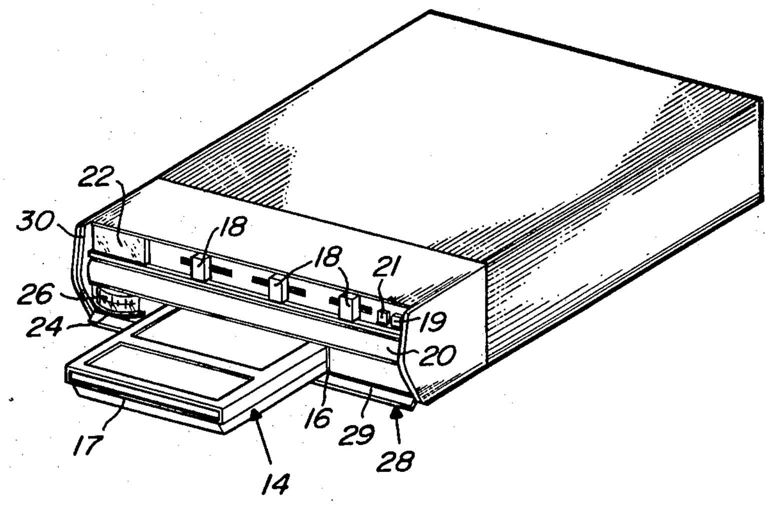
FIG. 3 is a perspective view of the combination tape player/radio receiver device of FIG. 2 shown with the tape cartridge in an ejected condition.

A manually operated door member 28, herein shown as a "roll" type door, is provided in the combination tape player/radio receiver device 10. The door is mounted at opposite ends thereof in suitable guides or tracks 30, FIGS. 1 and 4, for sliding movement between a fully closed condition (FIG. 1), a partially closed condition (FIGS. 2, 4 and 5) and a fully open condition (FIGS. 3 and 6). Upon movement to a fully open position the door member is moved into a channel 31 which adjoins the side guides 30 and is located beneath the cartridge receiving tunnel 12.

Figure 4:
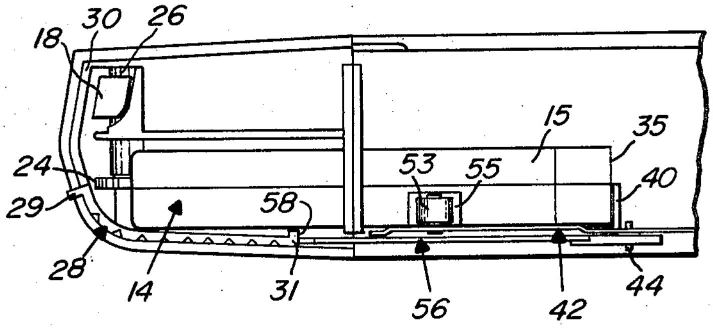
FIG. 4 is a cross sectional view of the combination tape player/radio receiver device of FIG. 2 taken along the line 4—4 thereof.
Figure 5:
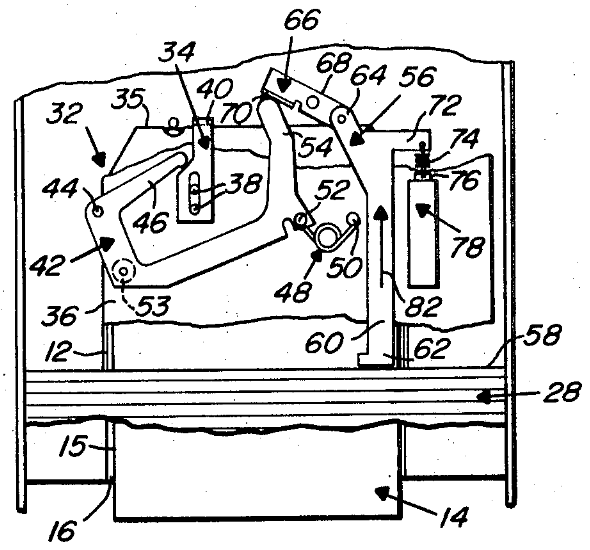
FIGS. 5 and 6 are bottom, partially cutaway views of the -combination tape player/radio receiver device of FIGS. 3 and 4, respectively, illustrating the cartridge eject mechanism and actuator assembly incorporated therein.
Figure 6:
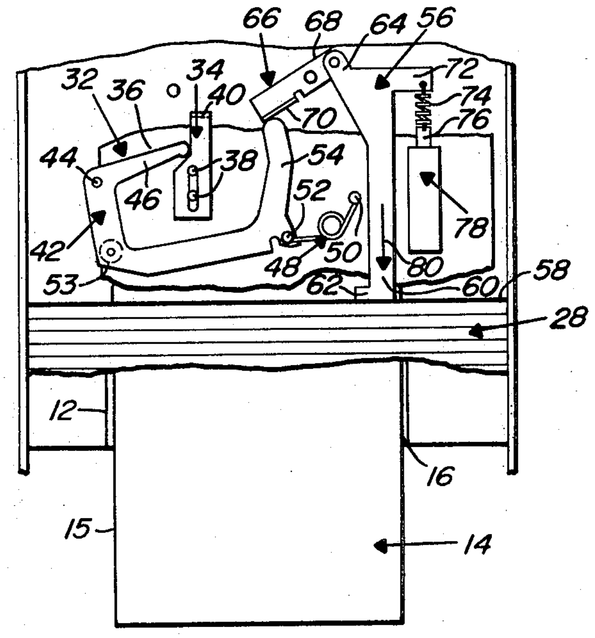

The combination tape player/radio receiver device 10 includes a cartridge locking and eject mechanism 32 shown in FIGS. 5 and 6. The mechanism is similar to that illustrated in U.S. Pat. No. 3,485,500, assigned to the same assignee as the instant invention, and includes a first arm 34 slideably mounted on the lower wall 36 of the chassis of the device 10 by means of rivets 38. A portion 40 of the arm 34 extends into the cartridge receiving tunnel in the path of a cartridge 14 for engagement with the leading end 35 thereof upon insertion of the cartridge into the tunnel (FIG. 4).

A second, C-shaped cartridge locking arm 42 is pivotally mounted at one corner 44 thereof on wall 36. A first leg 46 of the arm 42 is positioned for engagement with arm 34. An overcenter spring 48 is coupled between a rivet 50 on the wall 36 and a rivet 52 located on a second leg 54 of the C-shaped arm 42.

Insertion of a cartridge into the opening 16 of tunnel 12 causes the leading edge 35 of cartridge 14 to engage portion 40 of arm 34, moving the arm inwardly of the player. Arm 34 engages C-shaped arm 42 to pivot the latter in a counterclockwise direction as shown in FIGS. 5 and 6, to snap overcenter spring 48 from a first stable or eject position, shown in FIG. 6, to a second stable or eject-ready position, shown in FIG. 5.

Movement of the C-shaped locking arm as described causes a roller 53 mounted thereon to be received in a notch 55 (FIG. 4) in a side wall 15 of a cartridge 14 to releasably lock the cartridge firmly in position in the cartridge receiving tunnel during playback.

Actuation of the mechanism 32 to eject the cartridge from the player is accomplished by moving door member 28 from a partially closed position to a fully open position for engagement with a first link arm 60 of an actuator assembly 56 (FIGS. 5 and 6) interposed between the rear edge 58 of door 28 and leg 54 of the cartridge eject mechanism locking arm 52.

The link actuator arm assembly 56 includes first arm 60 mounted for sliding movement along wall 36 of the chassis of device 10, with a first end 62 thereof positioned for engagement with edge 58 of door 28. The opposite end 64 of arm 60 is coupled pivotally to a second pivotally mounted arm member 66 at one end 68 thereof. The opposite end 70 of the pivotal arm 66 is positioned for engagement with leg 54 of the C-shaped arm of the eject mechanism 32.

An extension portion 72 of arm 60 is coupled to a spring 74 which in turn is coupled to the actuating arm 76 of a switch 78. The last-mentioned switch 78 is coupled electrically to the tape player and radio receiver circuitry (not shown) and determines the mode of operation of the combination tape player/radio receiver device 10. The switch, as evidenced in the drawings (FIGS. 5 and 6) is operated by movement of the link arm 56 in accordance with the insertion or ejection of a cartridge into and out of the tunnel 12, respectively.

For purposes of affording a more complete understanding of the invention, it is advantageous now to provide a functional description of the mode in which the component parts thus far described co-operate.

When it is desired to operate the combination tape player/radio receiver device 10 in the tape player mode, the door member 28 is grasped at edge 29 thereof and is moved manually from the closed position of FIG. 1 to the fully opened position of FIG. 3 exposing the cartridge receiving opening 16, the controls 18, 19 and 21 and track indicator 22, as well as the radio receiver dial 26 and tuning control knob 24 adjacent thereto.

The on/off button 19 is depressed to provide power to the device. At this time, switch 78 is in the position shown in FIG. 6 of the drawings, to operate the device to the radio receiver mode.

Upon insertion of a cartridge into the openings 16 of tunnel 12, the cartridge engages portion 40 of arm 34 of the cartridge eject mechanism 32, to move the cartridge locking arm 42 from the eject position of FIG. 6 to an eject-ready position of FIG. 5.

Movement of the last-mentioned arm causes leg 54 thereof to engage the pivotal arm 66 of actuator assembly 56 and pivots the former in a clockwise direction as viewed in FIGS. 5 and 6 of the drawings to move arm 60 of the assembly in the direction of arrow 80 (FIG. 6) toward door member 28 for engagement therewith. Engagement of edge 62 of the door member recloses the door member to a partially closed position shown in FIGS. 2, 4 and 5, so that the upper edge portion 29 of the door covers the radio tuning knob 24 preventing access thereto, as well as a portion of the end 17 of cartridge 14. Movement of the link arm 60 as described likewise operates mode selector switch 78 to the cartridge tape player mode of operation.

Covering the radio tuner knob as described prevents one from misadjusting the radio receiver control while the device 10 is in the tape player mode of operation. In addition, if desired, the door 28 may be fully closed over the cartridge and controls while the tape is being played.

When it is desired to eject the cartridge 14 from the player/radio receiver device, one operating the device merely moves the door from the partially closed or fully closed position, as the case may be, to the fully open position of FIG. 3. Movement of the door as described is sufficient to engage link arm 60 therewith and move the last-mentioned arm in the direction of arrow 82 (FIG. 5) thereby pivoting arm 66 into engagement with arm 42. The locking arm 42 is thereby pivoted in a clockwise direction as viewed in the drawings against the force of overcenter spring 48 to move the latter to the snap-over point. Thereafter, the force provided by spring 48 quickly moves arm 34 engaging cartridge 14, toward the front of the device 10 to eject the cartridge therefrom through opening 16. Movement of the link arm 60 as described also operates switch 78 to the radio receiver mode. At this time, the radio receiver portion of device 10 is operable and may be tuned by manual movement of tuning control knob 24 which is now accessible.

While the cartridge eject door actuator mechanism is illustrated herein in a combination tape player/radio receiver device, it may be provided also in a unit comprising only a tape player, for ejecting a cartridge therefrom in response to the full opening of a door member such as shown herein.

While a particular embodiment of the invention has been shown and described, it should be understood that the invention is not limited thereto since many modifications may be made. It is therefore contemplated to cover by the present application any and all such modifications as fall within the true spirit and scope of the appended claims.

we claim:

1. A device adapted for playing tape cartridges including a housing having a tunnel with an opening thereinto for receiving a tape cartridge, tape playing means within said housing for playing back information recorded on a magnetic tape within a tape cartridge received in said tunnel, a door member covering said opening and being moveable between open and closed positions with respect to said opening, cartridge eject means operable to an eject condition for ejecting a cartridge from said tape player device and to an eject-ready condition upon insertion of a cartridge into said tunnel, link actuator means interposed between said door member and said cartridge eject means, said link actuator means being moveable in a predetermined direction into engagement with said cartridge eject means when the latter is in the eject-ready condition to cause said eject means to be operated to the eject condition for ejecting said cartridge from said tunnel through the opening in said housing, said link actuator means being moved in said predetermined direction in response to the movement of said door member to a fully open position while said cartridge is in said tunnel.

2. A device as claimed in claim 1 wherein said link actuator means is moved in a direction opposite said predetermined direction into a position for engagement by said door member upon insertion of a cartridge through said opening into said tunnel.

3. A device as claimed in claim 2 wherein said cartridge eject means includes a mechanism having a portion extending into said tunnel in the path of a cartridge received therein, and overcenter spring means coupled thereto for biasing said mechanism to first and second stable positions, said portion of said mechanism being engaged by a cartridge inserted into said tunnel to snap said overcenter spring means from said first to said second position, said overcenter spring means being moved from said second to said first stable position in response to the opening of said door member, thereby causing said portion of said mechanism to engage said cartridge and eject the latter from said tunnel through said opening in said housing wall.

4. A device as claimed in claim 3 wherein said door member is mounted for sliding movement between said open and closed positions and wherein said link actuator means includes a first arm member mounted for movement between said door member and said cartridge eject mechanism and a second pivotal arm member coupled to said first-mentioned arm member at the end thereof near said mechanism, said first arm member being moveable in said predetermined direction in response to the full opening of said door member to move the second arm member into engagement with said eject mechanism for operating said overcenter spring means from said second to said first stable position, thereby to eject said cartridge from said device.

5. A device as claimed in claim 2 further including radio signal receiving means and mode selector switch means coupled electrically to said radio signal receiving means and said tape playing means for actuating said device to tape player and radio modes of operation, said switch means including an actuator operable to first and second positions corresponding to said radio and tape player modes, respectively, said actuator being coupled mechanically to said link actuator means for movement therewith, said switch actuator being moved from said first, radio mode position to said second, tape player mode position upon insertion of a cartridge into said cartridge receiving tunnel and from said second, tape player mode position to said first, radio mode position upon ejection of a cartridge therefrom.

6. A device as claimed in claim 5 wherein said radio signal receiving means includes a manual tuning control for selecting radio frequencies received by said radio signal receiving means during the radio receiver mode of operation, said control being mounted adjacent said cartridge receiving opening and being coverable by said door member, and wherein upon moving said link actuator means in said opposite direction upon insertion of a cartridge into said tunnel, said link actuator means engage and partially closes said door member to cover said radio tuning control, making the latter inaccessible.

7. A combination cartridge tape player/radio receiver device comprising:

a housing having a tunnel with an opening for receiving a tape cartridge;

tape playing means for playing back information recorded on a magnetic tape within a tape cartridge received in said tunnel;

a door member covering said opening and being movable manually between open and closed positions with respect to said opening;

radio signal receiving means;

mode selector switch means coupled electrically to said tape playing means and said radio signal receiving means and actuable to a first tape playing mode and to a second, radio receiver mode for operating said tape playing means and radio signal receiving means, respectively;

cartridge eject means for ejecting a cartridge from said tape player and operable between eject-ready and eject conditions, said eject means being operated to the eject-ready condition upon insertion of a cartridge into said tunnel; and link arm means interposed between said cartridge eject means and said door member, said link arm means being movable in a first direction in response to the insertion of a cartridge into said tunnel, into engagement with said door member, when the latter is in the fully open condition, thereby to move the door member to a partially closed condition, and being movable in an opposite direction in response to the opening of said door member to a fully open position, into engagement with said cartridge eject means when the latter is in the eject-ready condition, to operate said eject means from the eject-ready condition to the eject condition for removing a cartridge from said tunnel;

said mode selector switch means being coupled to said link arm means and operable to said tape player and radio receiver modes in response to the movement of said link arm means in said first and opposite directions, respectively.

8. A combination cartridge tape player/radio receiver device as claimed in claim 7 further including radio tuning control means for changing the frequency of radio signals received by said radio signal receiving means in the radio receiver mode, said control means being mounted adjacent said cartridge receiving opening, said door member covering said control means upon being moved to a partially closed position in response to the insertion of a cartridge into said player, thereby preventing access to said control means during the tape player mode of operation.

9. A combination cartridge tape player/radio receiver device as claimed in claim 7 wherein said link means includes a first arm mounted for movement adjacent said cartridge receiving tunnel in the direction of insertion and ejection of a cartridge into and out of said tunnel, respectively, and wherein said door member is mounted in guides located on opposite sides of said tunnel opening and is receivable in the fully open condition, in a channel provided adjacent said tunnel, said link arm extending into said channel for engagement with said door member upon insertion of a cartridge into said tunnel.

10. A device adapted for playing tape cartridges including a housing having a tunnel with an opening thereinto for receiving a tape cartridge, tape playing means within said housing or playing back information recorded on a magnetic tape within a tape cartridge inserted into said tunnnel, and a door member covering said opening, said door member being operable manually to an open condition to permit insertion of a cartridge into said tunnel, and being closeable fully to cover completely said opening and cartridge inserted into said tunnel, thereby preventing access thereto and further including tape player controls mounted adjacent said cartridge receiving opening and being operable manually, said door member covering said tape player controls upon being moved to a fully closed condition and permitting access to aid controls upon being opened to a first predetermined position, said door member covering said cartridge and cartridge receiving opening when opened to said first predetermined position.

11. A device as claimed in claim 10 further including cartirdge eject means for ejecting a cartridge inserted into said tunnel and link means coupled between said door member and said cartridge eject means and engageable therewith, said link means actuating said cartridge eject means to eject a cartridge from said player upon movement of said door member to a fully open position while a cartridge is inserted into said player.

12. A device adapted for playing tape cartridges including a housing having a tunnel with an opening thereinto for receiving a tape cartridge, tape playing means within said housing for playing back information recorded on a magnetic tape within a tape cartridge inserted into said tunnel, and a door member covering said opening, said door member being operable manually to an open condition to permit insertion of a cartridge into said tunnel, and being closeable fully to cover completely said opening and cartridge inserted into said tunnel, thereby preventing access thereto and wherein said housing includes a pair of side guides on either side of said cartridge receiving opening in which said door member is slideably received, an a channel for receiving said door member when the latter is in an open condition, said door member being moved into said channel to expose said cartridge receiving opening and from said channel into said side guides for covering said opening.

* * * * *